United States Patent [19]

Inoue et al.

[11] 3,747,470

[45] July 24, 1973

[54] SPINDLE PROVIDED WITH AN ANTI-VIBRATION MECHANISM

[75] Inventors: Gentei Inoue; Chuichi Sato, both of Fujisawa; Mamoru Tanaka, Yokohama, all of Japan

[73] Assignee: Nippon Seiko Kabushiki Kaisha, Tokyo, Japan

[22] Filed: Aug. 10, 1971

[21] Appl. No.: 170,554

[30] Foreign Application Priority Data
Aug. 15, 1970 Japan............................ 45/102406

[52] U.S. Cl...................... 90/11 A, 408/143, 308/9
[51] Int. Cl........................... B23c 1/00, F16c 17/16
[58] Field of Search ..................... 308/9, 9 A; 90/11

[56] References Cited
UNITED STATES PATENTS
3,030,744  4/1962  Mueller.................................. 308/9
3,058,785  10/1962  Steele .................................... 308/9
3,493,273  2/1970  Greenberg.............................. 308/9

*Primary Examiner*—Charles J. Myhre
*Assistant Examiner*—Frank Susko
*Attorney*—Louis E. Marn et al.

[57] ABSTRACT

A spindle has its intermediate portion rotatably surrounded by a journal box and journalled in radial bearings provided in the journal box. In the journal box, a thrust bearing for absorbing the thrust load of the spindle is further provided, and the spindle has a flanged portion corresponding to the thrust bearing and inserted therein. A viscous fluid film forming mechanism is provided to attenuate the self-excited vibration which may occur in the spindle during its operation. The viscous fluid film forming mechanism is disposed around the spindle between the bearing portion and the loading point of the spindle, thereby attenuating the vibration of the spindle and ensuring smooth rotation thereof.

8 Claims, 6 Drawing Figures

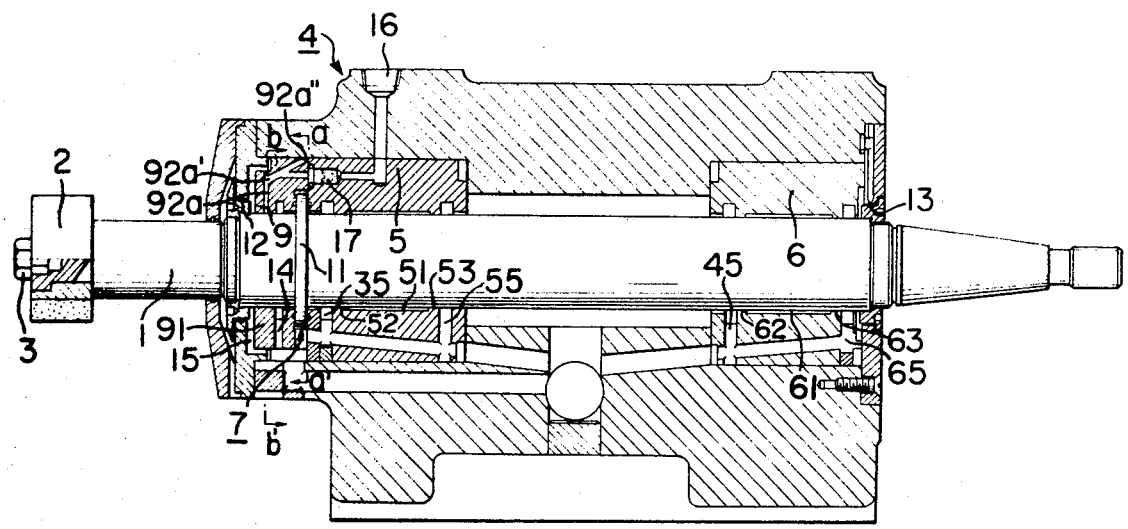
FIG. I
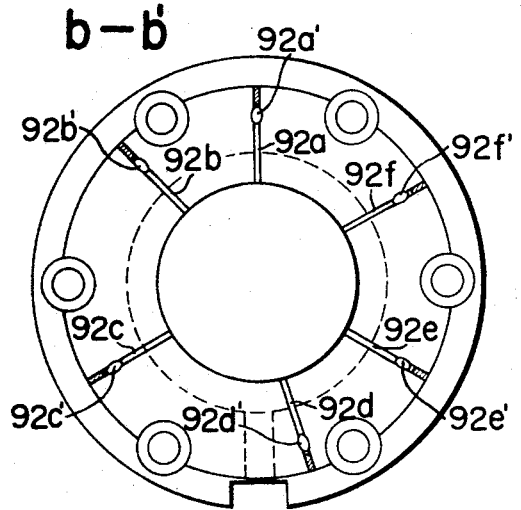
FIG. 2
b-b'
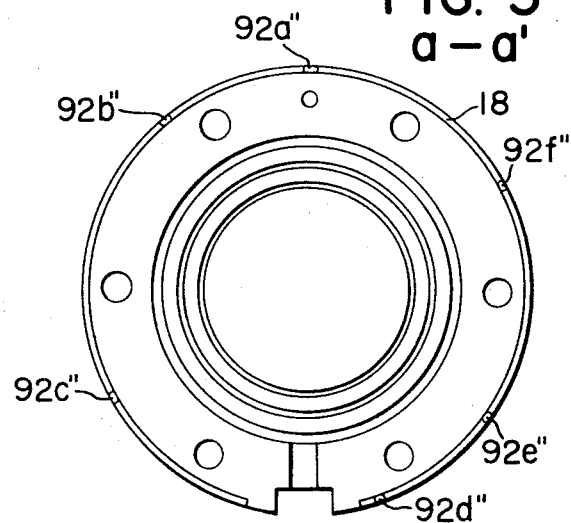
FIG. 3
a-a'

SPINDLE PROVIDED WITH AN ANTI-VIBRATION MECHANISM

BACKGROUND OF THE INVENTION

1. Field of the Invention

This invention relates to a spindle for use with machine tools such as lathes and grinders or with measuring instruments, and more particularly to a spindle provided with an improved mechanism for preventing a self-excited vibration of the spindle.

2. Description of the Prior Art

Heretofore, in the machine tools such as lathes and grinders, efforts to achieve a highly efficient cutting or grinding operation, respectively, by rotating the spindle art thereof at high speeds have produced in workpieces an adverse effect known as "chattering" due to the self-excited vibration caused in the spindle or have caused rapid wear of the cutting tool or grinding wheel.

The most prevailing concept in the art of spindle is that one of various bearings for the spindle which is adjacent to the loading point of the spindle should be located as near as possible to the loading point in view of the static rigidity and momentary load of the spindle, and in fact, such a particular bearing has most often been provided at a location near the loading point. In the past, however, prevention of the spindle vibration has usually been sought after by improving the radial bearing per se to thereby provide a spindle also having a good static rigidity. As will become apparent from the ensuing description of the present invention, such a conventional concept would not be able to provide a spindle whose vibration can be sufficiently attenuated. The reason is that since the vibration amplitude of a spindle having a load imparted at the loading point thereof is least in displacement at the radial bearing point of the spindle, it is not advisable to provide an anti-vibration mechanism in the bearing portion in order to attenuate the spindle vibration sufficiently. In order to prevent the self-excited vibration in the conventional spindles, it has been also conceivable to increase the diameter of the spindle or increase the size of the bearing, but this has empirically been found not as effective as expected. Especially, when the bearing in use is of the fluid type, its size could not be increased significantly because frictional heat tends to occur with the increase in the frequency of revolution of the spindle in such a case.

SUMMARY OF THE INVENTION

In an attempt to prevent the aforesaid self-excited vibration, the inventors have analyzed the displacement of the axis of the spindle by the use of a computer, and the result of the analysis has shown that the greatest amplitude of vibration occurs at a point of the spindle which is very close to the loading point and that the amplitude of vibration is relatively small in the portion of the spindle which ranges from the center of the spindle to the end thereof opposite to the loading point. For an improved efficiency of operation, it is therefore the most effective to prevent the self-excited vibration from occurring in the vicinity of the loading point, and thus a conclusion has been reached that a certain anti-vibration mechanism should be provided between the bearing and the loading point even with some sacrifice of the static rigidity of the spindle.

It is therefore an object of the present invention to provide a spindle in which the aforesaid self-excited vibration is prevented from occurring to thereby ensure a higher efficiency of cutting or grinding work, and more particularly, to provide a viscous fluid film forming mechanism between the bearing and the loading point of the spindle for attenuating the vibration of the spindle. The viscous fluid film forming mechanism provided according to the present invention is directed to a function different from that of the bearing, that is, it utilizes the damping effect of viscous fluid to attenuate the vibration and accordingly enhance the performance of the spindle. As will be apparent from the conclusion drawn from the analytical result obtained through a computer, the vibration amplitude of the spindle tends to show a marked increase in the portion of the spindle ranging from the radial bearing adjacent the loading point toward the loading point. From this it is followed that the viscous fluid film forming mechanism should effectively be provided at a location as near as possible to the loading point, but the general performance of the spindle is governed chiefly by the correlation between the dynamic and the static rigidity of the spindle and an extreme unbalance of such correlation may adversely affect the general performance of the spindle. In addition, there are requirements for the compactness of the entire apparatus and the easiness of manufacture. To meet all these requirements, it is most preferable that the viscous fluid film forming mechanism be disposed within a journal box having bearings contained therein and the location of the mechanism be as close as possible to the loading point of the spindle.

It is another object of the present invention to provide a viscous fluid film forming mechanism of simple construction for passing part of a pressurized viscous fluid through a throttle means before being supplied to the bearing portion so as to reduce its pressure to a level slightly above the atmospheric pressure so that the viscous fluid may be supplied continuously to the bearing portion while maintained at the reduced pressure level. In order that the viscous fluid film forming mechanism of the present invention may achieve a full effect, it is necessary to ensure the presence of the viscous fluid to at all times around the spindle portion surrounded by such mechanism, although the viscous fluid need not particularly be circulated under presure. This is because the viscous fluid film forming mechanism is meant to attenuate the spindle vibration due to the damping effect of such fluid and it will be sufficient for this purpose if the viscous fluid is always present around the spindle surface confined by that mechanism. To these ends, the present invention includes a rotary shaft having a tool such as grinding wheel or cutting tool attached to one end thereof, a journal box surrounding the intermediate portion of the rotary shaft and radial and having thrust bearings for journalling the rotary shaft, and a viscous fluid film forming mechanism disposed between the bearing portion and the tool or the loading point so as to prevent any self-excited vibration of the rotary shaft. Such a viscous fluid film forming mechanism may be realized by providing a cylindrical member around the rotary shaft with a slight clearance maintained between the inner side wall of the cylindrical member and the outer side wall of the rotary shaft, and providing the cylindrical member with at least one passage radial with respect to the rotary shaft so that viscous fluid supplied from outside the journal box may be passed through the radial passage into the slight clearance between the rotary shaft and the cylindrical member within the viscous fluid film forming mechanism, thereby forming in the slight clearance a film of viscous fluid which ensures smooth rotation of the rotary shaft and highly efficient cutting or grinding work.

The above and other objects and features of the present invention will become fully apparent from the following detailed description of a preferred embodiment of the invention taken in conjunction with the accompanying drawings.

BRIEF DESCRIPTION OF THE DRAWINGS

FIG. 1 is a front elevation, in cross section, of the spindle assembly according to the present invention.

FIG. 2 is an enlarged cross-sectional view of the viscous fluid film forming mechanism taken along lines b–b' of FIG. 1.

FIG. 3 is a enlarged front view of the same mechanism taken along lines a–a' of FIG. 1.

DESCRIPTION OF THE PREFERRED EMBODIMENT

Figure 4:
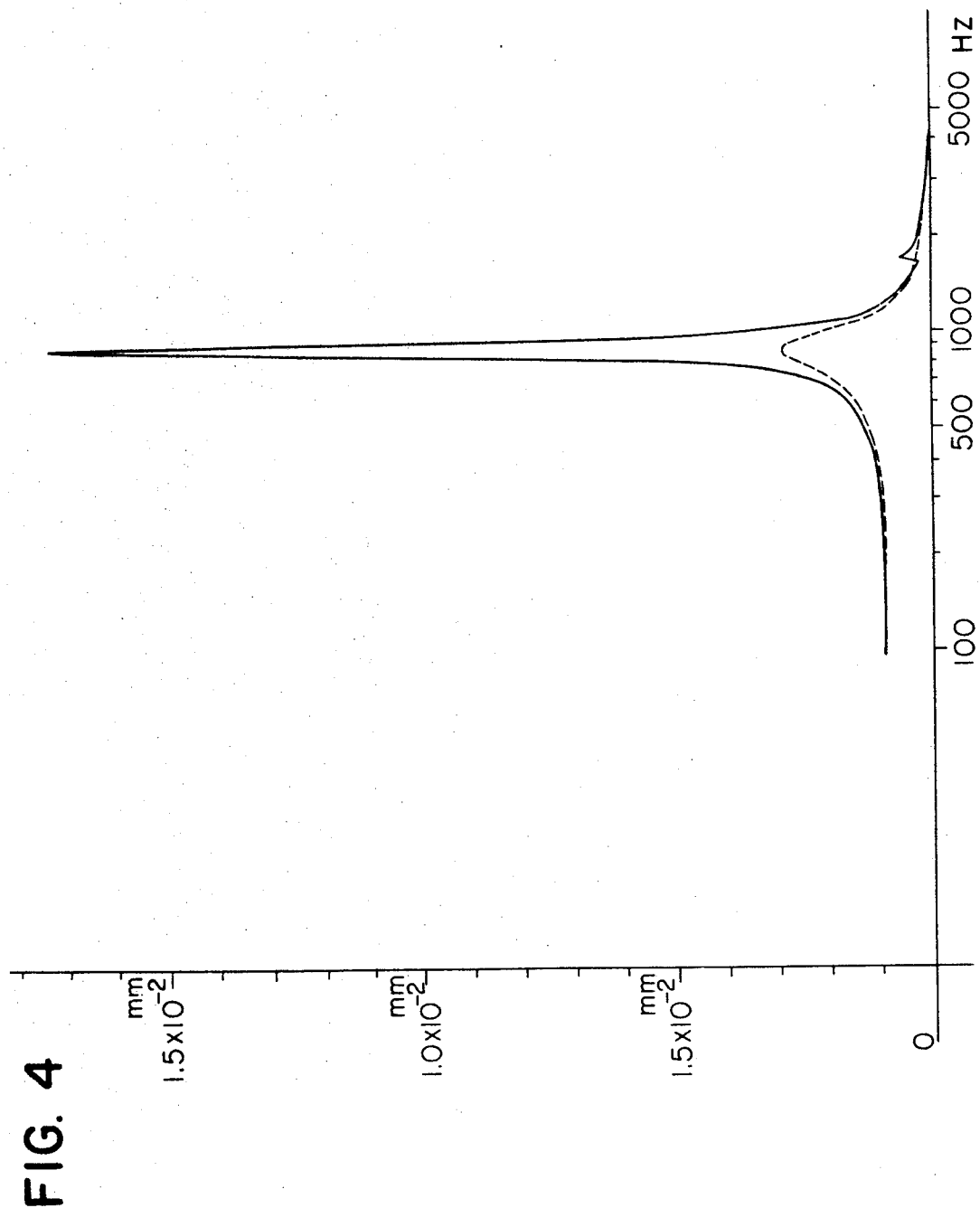
FIG. 4 is a half of a logarithmic graph obtained by plotting the vibration amplitude of the spindle as analyzed by a computer and showing the absolute displacement of the exciting point for a varying frequency of vibration occurring at the exciting point, wherein the abscissa represents the frequency of vibration.

Referring to FIGS. 1, 2 and 3, there is shown a preferred embodiment of the present invention. A rotary shaft 1 has a grinding wheel 2 attached to one end thereof by means of a bolt 3, and extends through a journal box 4. The rotary shaft 1 further has a flanged portion 11 for absorbing a thrust load of the rotary shaft and which is formed in the intermediate portion thereof toward the grinding wheel 2. The rotary shaft 1 has a somewhat smaller diameter at its opposite end portions than at its intermediate portion, and the opposite end portions of the shaft 1, together with the journal box 4, define sealing portions 12 and 13 for blocking leakage of viscous lubricant fluid.

The journal box 4 includes two radial bearing portions 5 and 6 for absorbing a radial load and a thrust bearing portion 7 for absorbing a thrust load. The radial bearing portions 5 and 6 comprise similarly shaped pockets 51, 61 and sealing portions 52, 53, 62, 63, the pockets 51 and 61 each being formed with a plurality of fluid supply passages (not shown). Adjacent to the respective sealing portions there are formed fluid discharge passages 35, 55 and 45, 65. The thrust bearing portion 7 is so formed as to define a slight clearance and pockets between itself and the thrust load flange 11 on the rotary shaft 1.

A mechanism for forming a film of viscous fluid to attenuate the vibration of the rotary shaft is generally designated by reference numeral 9 and provided in the journal box 4 adjacent to and axially outwardly of the thrust bearing portion 7. The mechanism 9 comprises a cylindrical member 91 disposed so as to maintain a slight clearance with respect to the rotary shaft 1 and having six radial passages 92a, 92b, 92c, 92d, 92e and 92f formed therein to supply viscous fluid therethrough to the clearance between the cylindrical member 91 and the rotary shaft 1. The number of such radial passages and the inner diameter of the cylindrical member 9 may be suitably determined by the type and required amount of the viscous fluid in use.

The mechanism 9 for forming a film of viscous fluid constitutes an essential part of the present invention, and the supply of viscous fluid to this mechanism will now be described. Viscous fluid under pressure is introduced from outside into the journal box 4 through an inlet 16. The viscous fluid introduced under pressure through the inlet 16 is passed through a flow rate throttle means 17, where the pressure of the fluid is reduced to a level slightly above the atmospheric pressure and part of such fluid is passed through a point 92a'' into an elongated groove 18 (FIG. 3) formed in the outer periphery of the cylindrical member 91, and then directed into the radial passage 92b, 92c, 92d, 92e and 92f through corresponding oblique passages both ends are shown as 92b'', 92c'', 92d'', 92e'', and 92f'', and 92b', 92c', 92d', 92e' and 92f', respectively, which are all formed in the outer periphery of the cylindrical member 91 obliquely with respect to the axial direction thereof. The other part of the viscous fluid which has passed through the throttle means 17 is directed through the point 92a' into the radial passage 92a, thus filling the slight clearance between the rotary shaft 1 and the cylindrical member 91 to form therein a viscous fluid film capable of attenuating the vibration of the rotary shaft. The viscous fluid in the said slight clearance is discharged through fluid discharge passages 14 and 15 formed adjacent to the viscous fluid film forming mechanism 9. Furthermore, the viscous fluid thus introduced under pressure can be provided by passing through a network of passages (not shown) into the radial bearings 5 and 6 of the rotary shaft 1 as well as into the thrust bearing 7.

When the above-described spindle for a grinding machine is driven through a belt and pulley assembly (not shown) at the opposite end to the grinding head and begins to grind a workpiece (not shown) by the grinding wheel 2, the radial load acting on the spindle is absorbed by the radial bearing portions 5 and 6 and the thrust load is absorbed by the thrust bearing portion 7. When the grinding wheel is brought into contact with the workpiece to receive a load, the rotary shaft 1 is subjected to the greatest deformation at the foremost end portion thereof which is immediately adjacent to the grinding wheel 2, and the self-excited vibration is also greatest in amplitude at that portion as described previously. Therefore, the nearer to the grinding wheel 2 or the loading point the viscous fluid film forming mechanism 9 for attenuating the self-excited vibration of the spindle is located, the greater the effect of attenuation will be provided by that mechanism. For such reason, according to the present invention, the mechanism 9 is located in the journal box 4 at a position near the grinding wheel 2 and forwardly of the bearing portions, as shown, in order that a rotational motion of the spindle which will generally result in a high grinding performance may be provided even with some sacrifice of the static rigidity of the spindle. Thus, the self-excited vibration of the spindle from the varying load imparted thereto by the work-piece can be attenuated by the viscous fluid supplied to the clearance between the cylindrical member 91 of the viscous fluid film forming mechanism 9 and the rotary shaft 1, thereby ensuring smooth rotation and high grinding performance of the spindle.

It will thus be appreciated that the spindle of the present invention provides a greatly improved resistivity to vibration only at the slight sacrifice of the static rigidity thereof, and generally achieves a considerably enhanced performance. Thus, the spindle of the present invention warrants its use as a spindle for high precision work. If such a spindle is employed as the operating rotary shaft of a lathe or a grinder, it will not only improve the critical limit of chattering but also enable high-speed grinding operation and accordingly greatly increase the efficiency of operation. The reduction in the static rigidity is so small that its influence upon the workpiece is negligible. Moreover, the highly improved resistivity to vibration is useful to reduce the wear of the grinding wheel or the cutting tool and this further leads to an advantage that the dressing of the grinding wheel or correction of the cutting tool can be made less frequent.

In the illustrated embodiment, the bearings of the spindle have been shown as the fluid type, but they may alternatively be of the roller type to attain the same effect as described above if the viscous fluid film forming mechanism for attenuating the vibration is located toward the loading point forwardly of the roller bearings.

Further, in addition to the radial passages provided as fluid supply passages, narrow circular grooves may be provided to uniformly supply the viscous fluid into the slight clearance between the rotary shaft and the cylindrical member. Or alternatively, pockets may be provided at the outlet of each of the radial passages to provide a uniform distribution of viscous fluid into the slight clearance.

To make its advantages better understood, the invention will now be compared with the conventional spindle in conjunction with the analytical results obtained through a computer for the described embodiment. These analytical results represent the typical performance achieved by the present invention.

If the axial dimension of the viscous fluid film forming mechanism is designated by $l$, the radial dimension of the clearance between that mechanism and the spindle by $h_o$, the outer diameter of the spindle by $D$, the damping force by $F$, the viscosity of the viscous fluid by $\mu$, and the amount of displacement of the fluid by $\underline{X}$, then the relation between these factors can be expressed as follows:

$$F = (3\pi/2)\mu(D/h_o)^3 D [(l/D) - \tan h(l/D))] \dot{\underline{X}}$$

If $l << D$, $$F = (\pi\mu l^3 D/2h_o^3) \dot{\underline{X}}$$

In the described embodiment substituting the values of, $\mu = 1.84 \times 10^{-8}$ kg.sec./cm$^2$, $l = 0.5$cm, $D = 3.7$cm, $h_o = 15 \times 10^{-4}$cm into the simplified expression. Hence, if $(\pi\mu l^3 D/2h_o^3) = C$, then the damping coefficient will be given as $C = 3.95$ kg.sec./cm. Therefore, when an exciting force $F = 1$ kg is imparted at the loading point of the spindle, the amount of displacement $\underline{X}$ can be obtained as the function of frequency of vibration.

In FIG. 4, the dotted-line curve illustrates the absolute displacement at the exciting point as analyzed by a computer when the spindle of the present invention is not rotated but vibrated at a varying frequency with an amplitude of the force of 1 kg while a film of viscous fluid is formed to attenuate the vibration. In the graph of FIG. 4, the solid-line curve represents the absoute displacement at the exciting point when the viscous fluid forming mechanism is not operated in the spindle of FIG. 1. It is seen that the vibration of the spindle differs markedly depending on whether the film of viscous fluid is formed or not. More specifically, in a spindle whose viscous fluid film forming mechanism is inoperative, the absolute displacement sharply increases for an excited vibration of 900 Hz or near, whereas in the spindle of the present invention the increase in absolute displacement is very small and this means that the film of viscous fluid contributes greatly to improve the resistivity to vibration.

Figure 5:
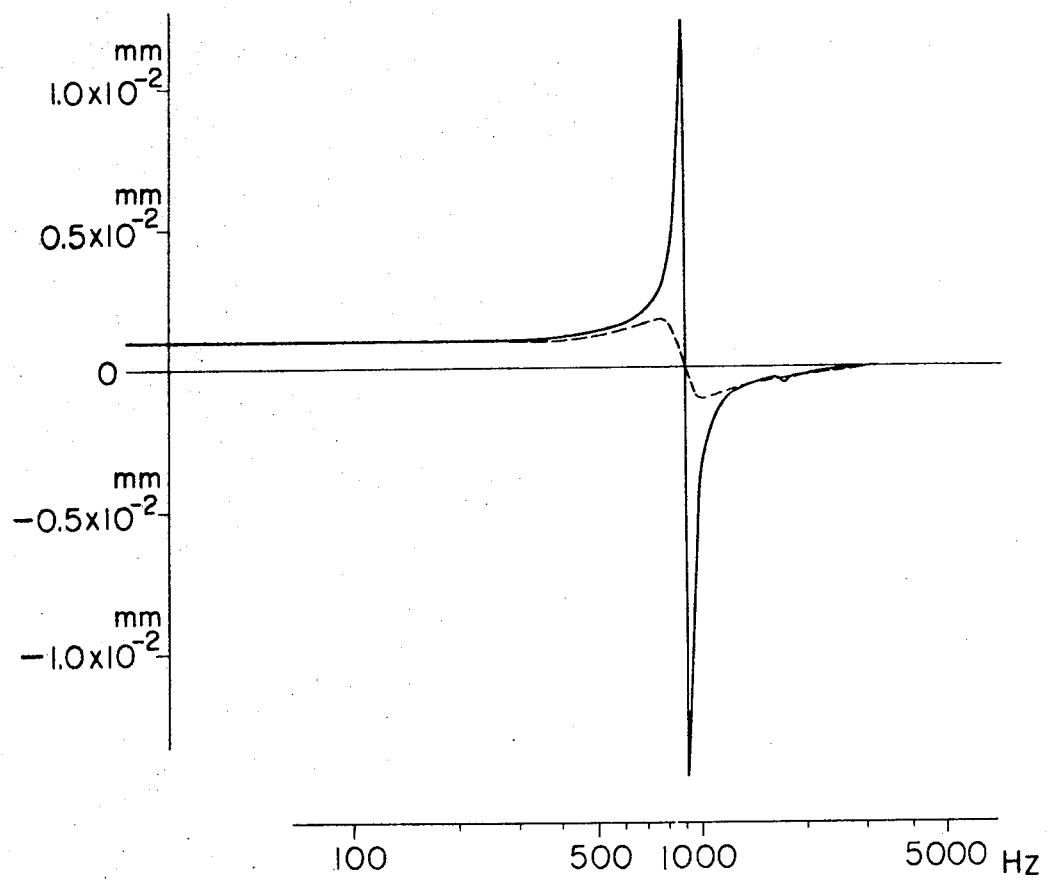
FIG. 5 is a half of a logarithmic graph obtained by plotting the vibration amplitude of the spindle as analyzed by a computer and showing the real part of displacement of the exciting point for a varying frequency of vibration occurring at the exciting point, wherein the abscissa represents the frequency of vibration.

FIG. 5 graphically illustrates the real part of displacement of the exciting point calculated for the spindle of FIG. 1 on the same condition as that of FIG. 4. The solid-line curve indicates the displacement of the spindle when the viscous fluid film forming mechanism is not operative, and the dotted-line curve shows the displacement when the viscous fluid film forming mechanism is operative in the spindle of the present invention.

According to the chattering vibration theory concerning the self-excited vibration, where the dynamic characteristic between the tool attached to the spindle and the workpiece is such as shown in FIG. 5, the limit of the condition under which chattering occurs as the result of the self-excited vibration is determined by the negative peak value in FIG. 5. If no negative component exists, no chattering will occur. As seen in FIG. 5, the spindle of the present invention shows some negative component, but such negative component may be reduced by increasing the axial dimension of the viscous fluid film forming mechanism and decreasing the radial dimension of the clearance. However, if the values of these factors are extremely increased or decreased to reduce the negative component, there will occur unfavorable problems such as friction and resultant heating or the problem of lost horse-power during the rotation of the spindle. Actually, therefore, the values of the said factors must be suitably selected in accordance with the conditions under which the spindle is used, and with the general performance of the spindle taken into consideration.

Figure 6:
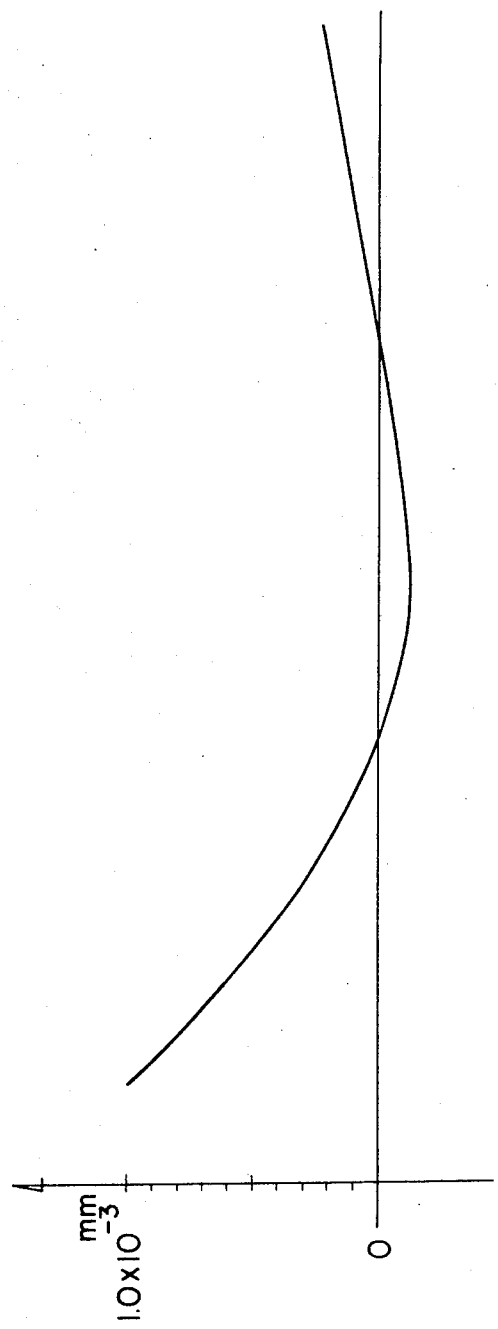
FIG. 6 is a graph obtained by plotting the vibration amplitude of the spindle as analyzed by a computer and showing a typical curve representing the vibration amplitude at various points of the spindle in the axial direction thereof for an exciting force of 1 kg imparted at the exciting point.

FIG. 6 illustrates the typical curve representing the variation occurring in the longitudinal vibration amplitude of the spindle when an exciting force of 1 kg is imparted at the exciting point. It can be clearly seen from this curve that the vibration amplitude of the spindle is not so much increased in the portion from the longitudinal center toward the opposite end to the loading point but is greatly increased in the portion from the center toward the loading point. Thus, it will readily be appreciated that the self-excited vibration of the spindle and the amplitude of the vibration may advantageously be minimized or reduced if the viscous fluid film forming mechanism for attenuating the vibration is provided between the bearing portion of the spindle and the loading point and as near as possible to the latter.

We claim:

1. A spindle provided with an anti-vibration mechanism comprising a rotary shaft, a journal box rotatably supporting said rotary shaft and surrounding the intermediate portion thereof, radial bearings provided in said journal box for journaling said rotary shaft, a thrust bearing provided in said journal box for absorbing the thrust load of said rotary shaft, said rotary shaft being formed with a flanged portion adapted to be inserted into said thrust bearing, a supply of viscous fluid and a mechanism adapted to receive said viscous fluid for forming a film of viscous fluid, said mechanism comprising a cylindrical member formed with a bore therein and disposed around said rotary shaft between the loading point of said spindle and one of said bearings adjacent to said loading point to maintain a slight clearance with respect to said rotary shaft, said cylindrical member having at least one passage formed therein radially with respect to said rotary shaft for supplying viscous fluid therethrough into said clearance.

2. A spindle provided with an anti-vibration mechanism according to claim 1, wherein said mechanism for forming a film of viscous fluid is provided within said journal box between the loading point of said spindle and one of said bearings adjacent to said loading point.

3. A spindle provided with an anti-vibration mechanism according to claim 2, wherein said cylindrical member has a plurality of radial passages formed therein for supplying viscous fluid therethrough, and oblique passages and a groove which is formed in the outer periphery of said cylindrical member for distributing said viscous fluid through a throttle means to each of said radial passages through each of said oblique passages, said oblique passages being oblique with respect to the axial direction of said cylindrical member.

4. An apparatus for hydrodynamically damping self-excited vibration in a spindle comprising in combination:

a rotary shaft;
a journal box for rotatably supporting said rotary shaft;
a plurality of radial bearings provided in said journal box for journaling said rotary shaft;
a tool means mounted on one end of said rotary shaft to contact with a work piece thereby constituting a loading point of said rotary shaft;
an anti-vibration mechanism formed with a bore slightly larger than the diameter of said rotary shaft and disposed in an alignment therewith such that a clearance between the outer surface of said rotary shaft and the surrounding surface of said bore is maintained said mechanism being positioned between the loading point of said rotary shaft and one of said bearings arranged closest to said loading point; and
means for supplying a viscous liquid into said clearance and for maintaining said viscous liquid therein whereby the self-excited vibration of said spindle in rotary motion is hydrodynamically damped by the damping effect of said viscous liquid.

5. The apparatus for hydrodynamically damping self-excited vibrations in a spindle as defined in claim 4 and further comprising a thrust bearing of the fluid or roller type in said journal box for absorbing the thrust load of said rotary shaft, said rotary shaft being formed with a flanged portion adapted to be inserted into said thrust bearing, and wherein said anti-vibration mechanism is positioned between said loading point of said rotary shaft and one of said bearings arranged closest to said loading point.

6. The apparatus for hydrodynamically damping self-excited vibrations in a spindle as defined in claim 4 wherein said viscous liquid is pressurized and said viscous liquid supplying means includes a throttle means to reduce the pressure of said pressurized viscous liquid to a level slightly above atmospheric pressure prior to introduction into said clearance.

7. The apparatus for hydrodynamically damping self-excited vibrations in a spindle as defined in claim 6 wherein said anti-vibration mechanism comprises a cylindrical member having a plurality of radial passages formed therein for supplying viscous liquid therethrough and a plurality of oblique passages, each of said oblique passages being in fluid communication with a corresponding one of said radial passages and a groove which is formed in the outer periphery of said cylindrical member for distributing said viscous fluid through a throttle means to each of said radial passages through each of said corresponding oblique passages, said oblique passages being oblique with respect to the axial direction of said cylindrical member.

8. The apparatus for hydrodynamically damping self-excited vibrations in a spindle as defined in claim 7 wherein said viscous liquid is a lubricating oil.

* * * * *